United States Patent [19]

Wormser et al.

[11] 3,945,244
[45] Mar. 23, 1976

[54] FLAME TYPE HALOGEN LEAK DETECTOR
[75] Inventors: Alex F. Wormser, Marblehead; Stephen P. Perkins, Beverly, both of Mass.
[73] Assignee: Wingaersheek, Inc., Peabody, Mass.
[22] Filed: Oct. 11, 1974
[21] Appl. No.: 514,113

[52] U.S. Cl. .................................. 73/40.7; 23/254 R
[51] Int. Cl.² .................... G01M 3/04; G01N 31/12
[58] Field of Search .............. 73/40, 40.7; 23/254 R

[56] References Cited
UNITED STATES PATENTS

| 2,106,147 | 1/1938 | Hull | 23/254 R |
| 2,134,552 | 10/1938 | Gaugler | 23/254 R |
| 2,200,523 | 5/1940 | Tuel | 23/254 R |
| 2,706,398 | 4/1955 | Davidson | 73/40.7 X |
| 2,809,101 | 10/1957 | Mitchell | 23/254 R |

Primary Examiner—Richard C. Queisser
Assistant Examiner—John S. Appleman
Attorney, Agent, or Firm—Kenway & Jenney

[57] ABSTRACT

The leak detector disclosed herein is of the type which detects the presence of halogen gases, such as fluorides, by the effect such gases have on the color of a flame in the presence of reactive copper. The flame is generated by a gas-fueled burner of exceptionally small and rather critical proportions, constructed so that the entire air supply for the burner may be obtained through a flexible search tube. Further, the reactive copper is provided integrally with the burner rather than as a separate element heated by the burner. The burner employs a disk-like flameholder which is proportioned to provide a stable flame despite the small size of the burner and which is itself constructed of copper so as to provide the reactive material to obtain flame color sensitivity.

4 Claims, 4 Drawing Figures

FLAME TYPE HALOGEN LEAK DETECTOR

BACKGROUND OF THE INVENTION

This invention relates to flame-type leak detectors and more particularly to such a detector having greatly improved sensitivity permitting the location of very small leaks of refrigerant gases containing halogens.

For detecting leaks in large air-conditioning systems employing Freon refrigerants, it has been common practice to locate such leaks with a flame-type detector. Such leak detectors have essentially comprised a conventional propane-type torch provided with a copper-containing reaction element located so as to be heated by the torch flame. By bleeding into the air supply of the torch air flow drawn through a flexible search tube, the presence of Freon in the atmosphere at the distal end of the search tube could be detected by noting the effect such gases have upon flame in the region of the copper reaction element. As is understood in the art, the fluorine in the Freon refrigerant reacts with copper to produce a green tint in the normally blue flame. While the leak detectors of the type available heretofore would detect leaks substantially smaller than those detectable with a soap solution, very small leaks could not be reliably located.

As a result of the need for leak detectors capable of detecting very small leaks, electronic leak detectors were evolved which could be adjusted to obtain the desired sensitivity. Such detectors, however, were both expensive and, for the refrigeration technician, relatively complicated to operate. In particular, the apparatus had to typically be calibrated so as to offset the presence of Freon in the atmosphere generally, i.e. a signal which might be considered "background noise" in the electronic sense.

One difficulty encountered in locating small leaks with prior art flame-type detectors was the dilution of the sample by the relatively large amount of air required for satisfactory burner operation. Further, the presence of Freon in the general atmosphere around the burner could mask the effects caused by Freon in the sample, i.e., some greenish tint would be produced by the fluorine in the main flow of combustion air to the burner so that the effect of any increased concentration of fluorine in the atmosphere at the distal end of the search tube was greatly diluted. In accordance with the present invention, a very small burner is utilized, i.e., a burner of about 1/10 the fuel and air consumption of earlier detectors. The inability of prior art constructions to operate a such low levels is believed to be due to the inability of the burners to overcome the pressure drop of the search tube and to sufficiently heat a reaction element. The present invention overcomes these difficulties through a critical design incorporating a novel reactor arrangement.

Among the several objects of the present invention may be noted the provision of a flame-type leak detector which will detect very small leaks; the provision of such a leak detector which is relatively unaffected by background levels of Freon; the provision of such a leak detector which is highly reliable and which is rugged and simple to operate; and the provision of such a leak detector which is of relatively simple and inexpensive construction. Other objects and features will be in part apparent and in part pointed out hereinafter.

SUMMARY OF THE INVENTION

Briefly, the present invention involves a burner-type leak detector for locating leaks of halogen containing gases. The detector employs a jet orifice to which is provided a halogen-free combustible fuel. A venturi is aligned with the orifice, there being an annular cavity of substantial diameter between the jet orifice and the venturi, the cavity being closed except for the orifice, the venturi and an air inlet port. The venturi opens into a flame tube, the flame tube being substantially bridged intermediate its ends by a disk-like flameholder. The flameholder is constructed of a copper-bearing material and is shaped to occlude the flame tube except for a series of circumferentially located notches occupying in the order of 14 of percent the area of the tube. The central portion of the flameholder generates a downstream zone of recirculating burned gases which provide continuous re-ignition of incoming fuel-air mixture and which heats the flameholder itself. The flame tube and the flameholder are relatively proportioned to cause the flameholder to operate in thermal equilibrium at a temperature of about 600°–900°F. A flexible inlet tube is coupled to the inlet port so that all of the air for supporing combustion in the flame tube can be drawn, by the action of the venturi, through the inlet tube. Accordingly, the color of the flame generated in the flame tube is highly sensitive to the presence of halogen, in the atmosphere adjacent the distal end of the inlet tube.

BRIEF DISCRIPTION OF THE DRAWINGS

Corresponding reference characters indicate corresponding parts throughout the several views of the drawings.

DESCRIPTION OF THE PREFERRED EMBODIMENT

Figure 1:
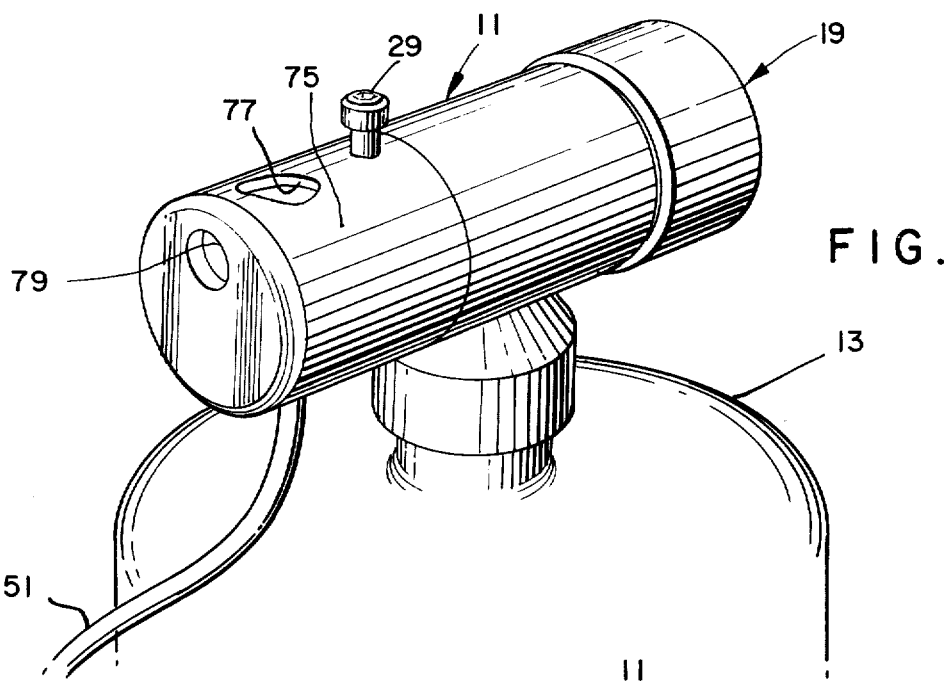
FIG. 1 is a side view, with parts broken away, of a leak detector in accordance with the present invention.

Referring now to FIG. 1, the leak detector of the present invention comprises a unitary burner and regulator assembly 11 adapted to be mounted directly on the top of a standard half-pound cylinder of propane 13 by means of a conventional fitting or coupling 15. Other gaseous fuels such as acetylene or Mapp gas may also be used. As illustrated in FIG. 1, the left hand portion of the assembly 11 comprises the burner, designated generally by reference character 17, while the right hand part is the regulator portion, designated generally by reference character 19. Fuel from the cylinder passes to the burner portion 17 through the regulator 19, being admitted to the regulator through a passage 21 and flowing at regulated pressure of about 24 p.s.i.g. from the regulator 19 to the burner 17 through a passage 23. The regulator is generally of the type disclosed in co-pending application Ser. No. 500,132 entitled Pressure Regulator and filed by Alex F. Wormser on Aug. 23, 1974 and thus is not described in greater detail herein.

Figure 2:
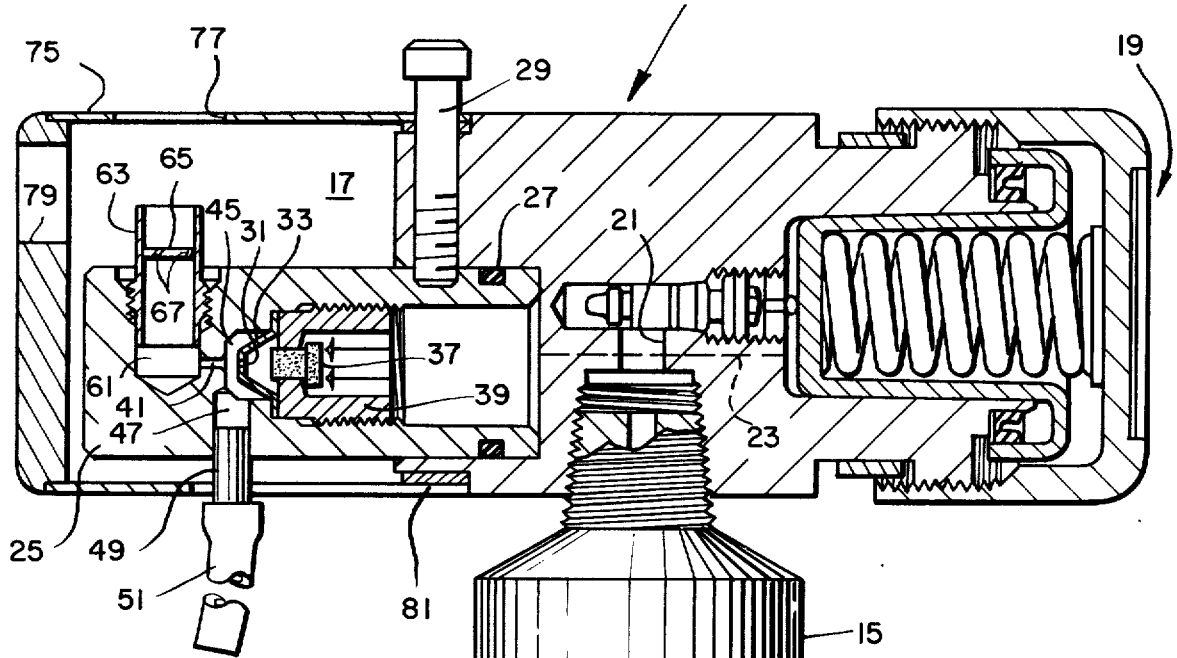
FIG. 2 is a side view, in section and to enlarged scale, of the burner portion of the flame detector of FIG. 1.

The burner 17 is assembled around a generally cylindrical base member 25 which is sealed to the body of the overall assembly 11 by means of an O-ring 27 and is retained by means of a thumbscrew 29. With reference to FIG. 2, fuel is metered into the burner itself through a very fine orifice 31 in a dimpled orifice plate 33. In a preferred construction of the detector, the orifice diameter was about 0.0013 inches and was cut in the stainless steel orifice plate 33 by means of a laser drill. Fuel is admitted to the orifice through a sintered bronze filter 37. Bronze filter 37 is pressed into a plug 39 which is screwed into the base member 25 so as to clamp the orifice plate in position, as illustrated. As an indicator of the relative size of the burner of the present invention, it may be noted that prior art detectors employ a fuel orifice in the order of 0.004 inches diameter.

Aligned with the orifice 31 is a venturi 41 cut into the base 25 itself. Venturi 41 has a nominal diameter in the order of 0.033 inches and a length in the order of 0.100 inches. The separation between the orifice and the mouth of the venturi is about 0.050 inch. The body member 25 is further shaped so as to provide, between the orifice 31 and the venturi 41, an annular cavity 45 which is of substantially larger diameter than the venturi 41. (FIG. 2) Cavity 45 is closed except for the jet orifice 31, the venturi 41 and an inlet port 47. Port 47 is coupled, through a tubular hose nipple 49, to a flexible sample inlet tube 51. Tube 51 is in the order of three feet long to facilitate the scanning of refrigeration components but is of relatively small inside diameter, e.g. in the order of ⅛ inch, so that the volume of air in the tube can be purged within a reasonable time by jet pump action of the venturi.

Figure 4:
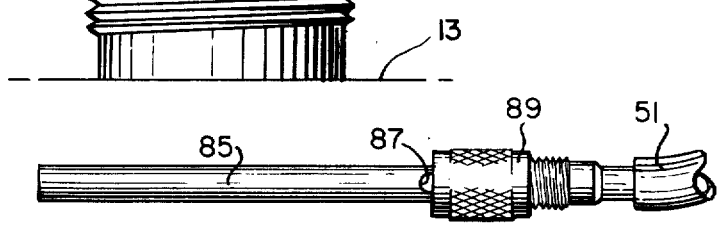
FIG. 4 is a side view of a search probe which may be used with the detector of FIG. 1.

If desired to permit a temporary reducing of sensitivity so as to minimize poisoning of the reactive surface, a manually operable bleed port can be provided to permit the temporary introduction of a diluting air flow. This is preferably provided at the probe end of the search tube so that response time is not adversely affected. For example, a probe as illustrated at 85 in FIG. 4 may be used, the probe having a port 87 which may be selectively uncovered by unscrewing a threaded collar 89, as illustrated.

Figure 3:
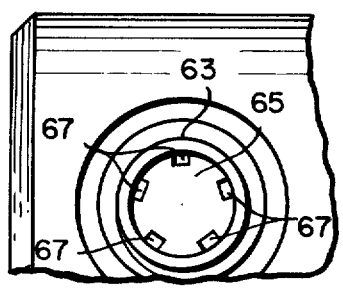
FIG. 3 is a top view of the flameholder employed in the burner taken substantially on the line 3—3 of FIG. 2.

The venturi 41 opens into a generally cylindrical vertical cavity 61 into which is threaded a flame tube assembly 63. The portion of the flame tube extending beyond its last contact with the body member 25 has an inside diameter of about 0.245 inches and a length of about 0.295 inches and is constructed of stainless steel, the wall thickness of this portion being in the order of 0.015 inches. A disk-like flameholder 65 is pressed into the flame tube so as to be spaced from the open end of the flame tube about 0.200 inches. In the preferred embodiment, the flameholder 65 is constructed of copper and is about 0.035 inches thick. As may be seen best in FIG. 3, flameholder 65 substantially occludes the flame tube 63 except for a series of five peripheral notches 67 which open about 14 percent of the flame tube cross-sectional area at that point. Preferably, the notches 67 are inclined as illustrated so as to impart a helical swirling movement of the burning gases downstream of the flameholder. As will be understood by those skilled in the art, the central portion of hub of the flameholder acts as a bluff body so as to generate a zone of recirculating burned gases with in the portion of the flame tube downstream from the flameholder. These recirculating burned gases both provide a continuous and reliable re-ignition of the incoming air-fuel mixture and tend to heat the flameholder 65 itself. The overall design of this burner follows the principles disclosed in the sole application of Alex F. Wormser entitled Wind-Proof Cigarette Lighter Burner Ser. No. 503,611, filed Sept. 6, 1974. As described in said application, the dimensions and proportions of a small burner, i.e., in the order of ¼ inch, are quite critical for stable and reliable operation.

As will be understood by those skilled in the art, the flameholder 65 will be heated directly by the recirculating gases and, to some extent, by heat transferred back from the downstream portion of the flame tube. Correspondingly, heat will flow out of the flameholder through the portion of the flame tube upstream of the flameholder. This heat loss, as well as the rate at which heat is absorbed from the recirculating gases, is also affected by the thickness of the flameholder. For example, the operating temperature of the flameholder can be reduced by making the flameholder thicker or the wall of the flame tube thicker and can be increased by making these dimensions thinner. As will be understood, the axial position of the flameholder within the flame tube will also influence its temperature. Accordingly, it can be seen that the operating temperature of the flameholder can be controlled by adjusting relative dimensions. In order to provide a temperature facilitating reaction of the copper with any Freon present in the combustion mixture, the dimensions of the flame tube/flameholder are adjusted to provide operation of the flameholder in thermal equilibrium at about 600°–900°F. While pure copper is used for the flameholder in the design illustrated, copper-bearing alloys such as brass may also be used and will provide sufficient reactive copper for usable sensitivity. As will be understood, cleaning of the surface of the copper flame-holder may be required from time to time to maintain sensitivity.

In operation, the leak detector disclosed has proven to be exceptionally sensitive and is in fact capable of detecting and locating leaks as small as 0.3 ounces per year. This sensitivity apparently flows from a critically designed burner which is extremely small and yet stable so that excessive dilution of the sample is avoided and which can take its entire air supply for combustion through the search tube 51. Accordingly, the presence of Freon in the air around the regulator and burner assembly has no affect on the flame color. Rather, the only background Freon which can affect the color of the flame is that immediately in the vicinity of the distal end of the search tube 51. Accordingly, incremental changes in flame color, e.g. as the distal end of the search tube is moved past an actual leak, will be readily visible since there is a one-for-one correspondence in the mixture being taken in through the hose and the air being provided for combustion. Further, since the burner is exceptionally small the total amount of air taken in at the distal end is relatively small, thereby increasing the relative concentration of Freon which can be generated by a very small leak. The flameholder is heated in a controlled manner as described above and hot metal is available for reaction, despite the small size of the burner. This is believed to substantially enhance the reliable, sensitive and stable operation. Thus, the operation of this detector is distinguishable from prior art systems in that the burner itself encompasses the reactive copper so that only a single reaction or flame region is present. In systems where a separate reaction element is heated by a burner, it appears that two separate reaction or flame zones are present, one at the burner itself and a somewhat separate flame at the reaction element, typically a copper ring.

A shroud 75 is provided to both protect the burner assembly and to enhance visibility and contrast in viewing the very small flame generated by the burner. Shroud 75 encloses the burner assembly except for a chimney port 77 directly above the flame and a viewing port 79 at the end of the shroud which permits the operator to look across the end of the flame tube at an otherwise darkened background. If desired, a glass window may be included in the viewing port. Shroud 75 is held on the assembly 11 by means of a friction ring 81.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A flame-type leak detector for locating leaks of fluorine containing gases into the atmosphere, said detector comprising:
    a jet orifice;
    means for providing a halogen-free combustible gaseous fuel to said orifice;
    means defining a venturi which is aligned with said orifice, there being an annular cavity of substantial diameter between said jet orifice and said venturi, said cavity being provided with an air inlet port;
    a flame tube into which said venturi opens;
    in said flame tube, a disk-like flameholder substantially bridging said flame tube intermediate its ends, said flameholder being constructed of copper and being shaped to occlude said flame tube except for a series of circumferentially located notches opening a minor portion of the area of said tube, said notches being inclined to impart a swirling movement to gases passing said flameholder, the central portion of said flameholder generating a downstream zone of recirculating burned gases which provides continuous re-ignition of incoming fuel-air mixture and which heats said flameholder itself, said flame tube and said flame-holder being relatively proportioned to cause said flameholder to operate in thermal equilibrium at a temperature of about 600°–900°F; and
    a flexible inlet tube coupled to said sample inlet port, whereby the color of a flame generated in said flame tube is highly sensitive to the presence of halogen compounds in the air immediately adjacent the distal end of said inlet tube.

2. A detector as set forth in claim 1 further comprising, at the distal end of said tube, a probe having a selectively openable port permitting the sensitivity of said detector to be temporarily reduced.

3. A flame-type leak detector for locating leaks of fluorine containing gases into the atmosphere, said detector comprising:
    a jet orifice having a nominal diameter in the order of 0.0013 inch;
    means for providing a halogen-free combustible gaseous fuel at an essentially predetermined pressure to said orifice;
    means defining a venturi which is aligned with said orifice, the nominal diameter of said venturi being in the order of 0.033 inch, there being an annular cavity of substantial diameter between said jet orifice and said venturi, said cavity being closed except for said orifice, said venturi and an air inlet port;
    a flame tube into which said venturi opens, the nominal inside diameter of said flame tube being in the order of 0.245 inch; in said flame tube, a disk-like flameholder substantially bridging said flame tube intermediate its ends, said flameholder being constructed of copper and being shaped to occlude said flame tube except for a series of circumferentially located notches opening in the order of 14 percent of the cross-sectional area of said tube, the central portion of said flameholder generating a downstream zone of recirculating burned gases which provides continuous re-ignition of incoming fuel-air mixture and which heats said flame-holder itself, said flame tube and said flameholder being in thermal contact between said notches and being relatively proportioned to cause said flameholder to operate in thermal equilibrium at a temperature of about 600°–900°F; and
    a flexible inlet tube coupled to said sample inlet port, said tube having a nominal inside diameter in the order of ⅛ inch and a length of several feet, all of the air for supporting combustion in said flame tube being drawable, by the action of said venturi, through said inlet tube,
    whereby the color of the flame generated in said flame tube is highly sensitive to the presence of halogen compounds in the air immediately adjacent the distal end of said inlet tube.

4. A flame-type leak detector for locating leaks of fluorine containing gases into the atmosphere, said detector comprising:
    a jet orifice having a nominal diameter in the order of 0.0013 inch;
    means for providing a halogen-free combustible gaseous fuel at an essentially predetermined pressure to said orifice; means defining a venturi which is aligned with said orifice, the nominal diameter of said venturi being in the order of 0.033 inch, there being an annular cavity of substantial diameter between said jet orifice and said venturi, said cavity being closed except for said orifice, said venturi and an air inlet port, the mouth of the venturi being separated from the orifice by about 0.050 inch;
    a steel flame tube into which said venturi opens, the nominal inside diameter of said flame tube being in the order of 0.245 inch, the wall thickness of said tube being in the order of 0.015 inches;
    in said flame tube, a disk-like flameholder substantially bridging said flame tube intermediate its ends, said flameholder being constructed of copper and being shaped to occlude said flame tube except for a series of circumferentially located notches opening in the order of 14 percent of the cross-sectional area of said tube, the central portion of said flameholder generating a downstream zone of recirculating burned gases which provides continuous re-ignition of incoming fuel-air mixture and which heats said flameholder itself, said flame tube and said flame-holder being in thermal contact between said notches and being relatively proportioned with the thickness of said flameholder being about 0.035 inch to cause said flameholder to operate in thermal equilibrium at a temperature of about 600°–900°F; and a flexible inlet tube coupled to said sample inlet port, said tube having a nominal inside diameter in the order of ⅛ inch and a length of several feet, all of the air for supporting combustion in said flame tube being drawn, by the action of said venturi, through said inlet tube, whereby the color of the flame generated in said flame tube is highly sensitive to the presence of halogen compounds in the air immediately adjacent the distal end of said inlet tube.

* * * * *